Patented Mar. 24, 1936

2,035,141

UNITED STATES PATENT OFFICE 2,035,141

METHOD OF REFINING ROSIN

Durain C. Butts, Sandusky, Ohio, assignor to Hercules Powder Company, Wilmington, Del., a corporation of Delaware No Drawing. Application May 31, 1932,
Serial No. 614,643

27 Claims. (Cl. 87—2)

My invention relates to an improved method for refining rosin and more particularly for the refining of wood rosin. It will be understood that my invention is applicable to the treatment of gum rosin as well as to the treatment of wood rosin, though, as has been indicated, it is of special advantage in the treatment of wood rosin.

Rosin and especially wood rosin and the lower grades of gum rosin, contain visible coloring matter, which darkens the color of the rosin and renders it unsuitable for various uses. Further, wood rosin and low grade gum rosin contain certain latent color bodies which, under normal circumstances, are not observable and do not affect the color of the rosin, but which darken, for example, when the rosin is subjected to the action of oxygen, as in the air, in the presence of an alkali as, for example, in rosin soaps, limed varnishes, certain sizes, etc., and which hence deleteriously affect the color of the product containing such rosin.

The presence of latent color bodies in a rosin renders such rosin of no use in the production of high grade soaps, limed varnishes, sizes, etc., which contain an alkali, since the color bodies gradually darken when the product is exposed to the air and cause undesirable darkening of the product.

Heretofore, various methods have been suggested for the removal of visible coloring matter from rosin and also for the removal of latent color bodies from rosin containing latent color bodies and such methods have proved substantially effective. However, such methods are not always effective for the production of rosin having maximum lightness of color and at the same time having maximum desirable characteristics generally.

My invention has for its object a method for the treatment of rosin whereby a rosin of desired lightness of color will be produced and at the same time a rosin free from or of reduced latent color body content where such are present in the rosin treated and which further will have a very substantially reduced tendency to crystallize as compared with rosin treated for the removal of coloring matter and/or latent color bodies by methods heretofore known.

In accordance with the method embodying my invention, the rosin is first preliminarily refined by treatment for the removal of more or less visible coloring matter and/or latent color bodies if present and is then subjected to a heat treatment with exclusion of air, or in a non-oxidizing atmosphere. The heat treatment of the rosin will have the effect of substantially lightening the color of the rosin, reducing its latent color body content if such are present and substantially reducing the tendency of the rosin to crystallize.

In the practical adaptation of the method in accordance with my invention the rosin is, for example, first subjected to distillation for the removal of visible color bodies or, for example, to extraction with a selective solvent for latent color bodies and is then subjected to heat treatment with exclusion of air or in a non-oxidizing atmosphere at a temperature within about the range 250° C. to 350° C. for a period not exceeding about a quarter of an hour.

The heat treatment of the rosin after preliminary refinement in accordance with my invention may be accomplished in any suitable vessel which is partially closed to prevent free access of air or in which is provided a non-oxidizing atmosphere, as of carbon dioxide, carbon monoxide, steam, or the like. In the treatment the rosin is heated to a temperature desirably within the range 250° C.–350° C., or preferably within the narrower range 280° C.–325° C., and held at such temperature for not in excess of about one quarter hour, after which the rosin is cooled in a non-oxidizing atmosphere. For example, rosin may be refined by heating it up in a partially closed vessel, or in a non-oxidizing atmosphere, to about 300° C., the temperature being maintained for about five minutes and the rosin then being cooled in a non-oxidizing atmosphere, say of carbon dioxide passed through the vessel in a stream.

In carrying the method in accordance with my invention into practice, the rosin, when it contains latent color bodies, as in the case of wood rosin, may be first preliminarily refined by treatment with a substance a solvent of the latent color bodies, and which may also be a solvent for visible color bodies as, for example, a non-alkaline, organic liquid, such as furfural, furfuryl alcohol, aniline, phenol, liquid sulphur dioxide, a chlorohydrin, etc. The rosin may be subjected to the treatment with a latent color body solvent in solution in a solvent for the rosin which is substantially immiscible with the solvent for the color bodies at or below a normal temperature, say for example, a temperature within the range 5° F. to 125° F., such as gasoline, naphtha, petroleum ether, or other light petroleum distillate, or other rosin solvent which is substantially immiscible or capable of being rendered substantially immiscible with the solvent for the color bodies and which has a greater selective solvent action on the rosin than on the color bodies and hence an equivalent for the rosin solvents mentioned. After treatment of the rosin for the removal of color bodies, as indicated, the treated rosin is heated for a period of not over one-quarter hour, at a temperature within about the range of, for example, 250° C.–350° C. The heating may be effected in a partially closed vessel so that air will be substantially excluded, or, if desired, in the presence of a non-oxidizing atmosphere as, for example, carbon dioxide, carbon monoxide, steam, or the like, with avoidance of any substantial distillation during the heating.

In carrying out the method where the selective solvent for the color bodies has also a solvent action on the rosin, the rosin may be treated with the solvent for the color bodies alone, the rosin to be treated being subjected to the action of a quantity of the solvent, which in due course will dissolve the rosin and contained color bodies. The rosin substantially freed from color bodies being recovered by evaporation off of the solvent to a point such that the refined rosin will be precipitated from the solvent while the color bodies will be retained in the solution in the solvent. If desired, after the rosin and contained color bodies become dissolved in the solvent for the color bodies, the rosin may be extracted from the solvent for the color bodies by admixing with the solution a quantity of solvent for the rosin, which will extract the rosin from the solution leaving the color bodies in the solution. Since the solvent for the rosin, as has been indicated, is substantially immiscible with the selective solvent for the color bodies, the extracted rosin in solution in the rosin solvent may be readily separated from the color bodies in solution in the solvent for the color bodies by merely regulating the temperature of the admixed solvents and permitting separation into layers by gravity, or the separation may be effected by centrifugation. As an alternative method of carrying out the method, the rosin containing color bodies may be first dissolved in a suitable solvent and the solution subjected to treatment, as by washing with a quantity of the selective solvent for the color bodies contained in the rosin. With such procedure the solvent for the color bodies extracts the color bodies from the solution of rosin in its solvent and the two solutions thus formed may be readily separated by control of the temperature of the mixture and settlement, or by centrifugation.

In carrying out the method, the solvent for the color bodies and the solvent for the rosin may desirably be miscible at certain temperatures as well as immiscible at other temperatures. In such case, the method may be carried out by first dissolving the rosin in the solvent for the rosin, adding to the solution a quantity of the solvent for the color bodies, controlling the temperature of the mixture to effect miscibility of the two solvents and finally controlling the temperature to effect immiscibility with subsequent separation by settlement or centrifugation.

As has been indicated, the method in accordance with this invention may be practically adapted by subjecting the rosin to a preliminary refining treatment for the removal of visible color bodies only or such a treatment as will remove visible color bodies as compared with latent color bodies. Thus, for example, the rosin which may be wood or gum rosin may be preliminarily refined by distillation. As illustrative, for example, rosin, as ordinary wood rosin, may be distilled by heating preferably indirectly, as with an oil bath maintained at a temperature of about 250–310° C., under a pressure of about 0.1–1.5 inches mercury.

As examples of the practical adoption of the method in accordance with my invention, the following will be illustrative.

For example, 15 pounds of wood rosin, are dissolved in 85 pounds of gasoline and to the solution formed is added 11 pounds of technical furfural and the mixture thoroughly agitated to secure intimate contact between the furfural and the gasoline-rosin solution. The mixture is then allowed to separate with the result that the furfural and dissolved color bodies will separate into a layer beneath a layer of gasoline-rosin solution, which may be siphoned or decanted off and from which refined rosin substantially freed from color bodies may be recovered by distillation off of the gasoline. The treatment above may be carried out at normal room temperature, say about 60° F., or alternatively the mixture of rosin solution and furfural may be heated to a temperature at which the furfural will go into solution in the gasoline, for example, a temperature of about 115° F., after which the temperature of the resultant solution is lowered to a point at which the furfural and gasoline are immiscible or will separate, which may be a normal room temperature, say 60° F., and the separation may be effected at a temperature lower than normal room temperature, say 10° F., whether the mixture of gasoline-rosin solution and furfural is heated or merely agitated, it being appreciated that the lower the temperature used, the more rapid and complete will be the separation.

On separation of the gasoline-rosin solution from the furfural-color body solution, it will be found that the gasoline-rosin solution will contain some furfural and a small amount of color bodies and that the furfural-color bodies solution will contain some gasoline and rosin, since the furfural is not completely immiscible with or separable from the gasoline and the furfural has a solvent power on the rosin though used in insufficient quantity, relative to the quantity of gasoline used, to take up any very substantial quantity of the rosin. If a more completely refined rosin is desired, the gasoline-rosin solution, after treatment with and separation from the furfural, may be retreated with a further quantity of furfural, or a greater quantity of furfural, relative to the quantity of gasoline, may be used in the initial treatment, though such proceeding will reduce the yield of refined rosin.

As illustraive of an alternative application of the method embodying my invention, for example, 15 pounds of rosin may be dissolved in 11 pounds of technical furfural and 85 pounds of gasoline added to the solution. The mixture is then agitated, or heated to a temperature at which the furfural will dissolve in the gasoline, say 115° F., followed by separation of the gasoline-rosin solution from the furfural-color-bodies solution, at room temperature, say 60° F. or below, say 10° F. If desired, the rosin solution, after separation from the furfural-color-bodies solution, may be treated with furfural and further refinement of the rosin.

The rosin, grading I in color, acid No. 163, after completion of the treatment with furfural, is placed in a suitable vessel, which is partially closed for the exclusion of air, and subjected to a temperature of say about 300° C. for a period of five minutes, carbon dioxide gas being steadily passed through the vessel during the cooling period. The product will grade N or better in color and have an acid number of 160. It will be obvious that instead of heating the rosin in batches, it may be passed in a continuous stream through heated tubes in which it may be subjected to a temperature within the range 275° C. to 300° C. for not to exceed ten minutes.

It will be appreciated that in place of furfural various other solvents for the color bodies may be used, as indicated herein, and that in place of gasoline other equivalent solvents for the rosin may be used, as indicated herein. Likewise, chemically inert gases equivalent to carbon dioxide may be used in connection with the heat treatment.

As further illustrative, for example, ordinary FF wood rosin is subjected to distillation under a pressure of 0.5 inches of mercury and under a bath temperature of about 280° C. The distilled rosin, from which visible coloring matter will have been removed by the distillation, will grade M+ in color. The distilled rosin is then heat treated by heating for say about one-quarter of an hour at a temperature of 315° C. in an atmosphere of, for example, carbon dioxide. The product of the heat treatment will be found to be of WW grade and at the same time the laten color body content of the wood rosin will be largely reduced.

In carrying out the process embodying this invention the rosin, instead of being treated with a selective solvent for color bodies, may be equivalently subjected to treatment with an absorbent for color bodies before being subjected to the heat treatment. Thus, the rosin in solution in a rosin solvent may be filtered through a color body absorbent as, for example, fuller's earth, activated carbon, etc., and the refined rosin then heat treated as described, or, if desired, the rosin after treatment with a selective solvent for color bodies may be subjected to treatment with an absorbent for color bodies and the refined rosin then heat treated.

The rosin the result of the treatment in accordance with my invention, as illustrated above, will be found to be of an extremely light color and to be largely free from color bodies where the rosin before heat treatment is partially refined by treatment with a selective solvent for latent color bodies.

It will be understood that in the carrying out of the method in accordance with my invention no particular form of apparatus is required. It will be further obvious that the method in accordance with my invention is adaptable for the treatment of rosin generally, including both wood and gum rosin, though, as has been indicated, it is more particularly adaptable for the treatment of wood rosin, or gum rosin containing latent color bodies.

This application constitutes a continuation in part of the application filed by me February 12, 1929, Serial No. 339,485.

What I claim and desire to protect by Letters Patent is:

1. The method of refining rosin containing latent color bodies which includes treating rosin in solution in a solvent therefor with a substance a selective solvent for latent color bodies contained in the rosin and which is capable of immiscibility with the rosin solvent separating refined rosin from the solvent and then heating the refined rosin in a substantially non-oxidizing atmosphere and without substantial distillation of rosin until the color of the rosin has been materially improved.

2. The method of refining rosin containing latent color bodies which includes treating rosin in solution in a solvent therefor with a substance a selective solvent for latent color bodies contained in the rosin and which is capable of immiscibility with the rosin solvent separating refined rosin from the solvent and then heating the refined rosin in a substantially non-oxidizing atmosphere to a temperature within about the range 250–350° C. under a pressure at which substantial distillation of the rosin will be avoided at the temperature used until the color of the rosin has been materially improved.

3. The method of refining rosin containing latent color bodies which includes treating rosin in solution in a solvent therefor with a substance a selective solvent for latent color bodies contained in the rosin and which is capable of immiscibility with the rosin solvent separating refined rosin from the solvent and then heating the refined rosin in a substantially non-oxidizing atmosphere to a temperature of about 285° C. under a pressure at which substantial distillation of the rosin will be avoided at the temperature used until the color of the rosin has been materially improved.

4. The method of refining rosin containing latent color bodies which includes treating rosin in solution in a suitable solvent therefor with a substance a solvent for latent color bodies contained by the rosin which is capable of substantial immiscibility with the rosin solvent separating refined rosin from the rosin solvent and then heating the refined rosin in a substantially non-oxidizing atmosphere and without substantial distillation of rosin until the color of the rosin has been materially improved.

5. The method of refining rosin containing latent color bodies which includes treating rosin in solution in a suitable solvent therefor with a substance a solvent for latent color bodies contained by the rosin which is capable of substantial immiscibility with the rosin solvent, separating rosin from rosin solvent and then heating the treated rosin in a substantially non-oxidizing atmosphere and without substantial distillation of rosin until the color of the rosin has been materially improved.

6. The method of refining rosin containing latent color bodies which includes treating rosin in solution in a suitable solvent therefor with a suitable organic solvent for latent color bodies contained by the rosin which is capable of substantial immiscibility with the rosin solvent, separating the rosin from the solvent therefor and then heating the treated rosin in a substantially non-oxidizing atmosphere to a temperature within about the range 250–350° C. under a pressure at which substantial distillation of the rosin will be avoided at the temperature used until the color of the rosin has been materially improved.

7. The method of refining rosin containing latent color bodies which includes treating rosin in solution in a suitable solvent therefor with a substance a solvent for latent color bodies contained by the rosin which is capable of substantial immiscibility with the rosin solvent, separating the rosin from the solvent therefor and then heating the treated rosin in a substantially non-oxidizing atmosphere to a temperature within about the range 250–359° C. under a pressure at which substantial distillation of the rosin will be avoided at the temperature used until the color of the rosin has been materially improved.

8. The method of refining rosin containing latent color bodies which includes treating rosin in solution in gasoline with a substance a solvent for latent color bodies contained by the rosin which is capable of substantial immiscibility with the rosin solvent, separating the rosin from the solvent therefor and then heating the treated rosin in a substantially non-oxidizing atmosphere to a temperature within about the range 250–350° C. under a pressure at which substantial distillation of the rosin will be avoided at the temperature used until the color of the rosin has been materially improved.

9. The method of refining rosin containing latent color bodies which includes treating rosin in solution in a suitable solvent therefor with furfural, separating the rosin from the solvent therefor and then heating the treated rosin in a substantially non-oxidizing atmosphere to a temperature within about the range 250–350° C. under a pressure at which substantial distillation of the rosin will be avoided at the temperature used until the color of the rosin has been materially improved.

10. The method of refining rosin containing latent color bodies which includes treating rosin with furfural separating refined rosin from furfural and then heating the refined rosin in a substantially non-oxidizing atmosphere and without substantial distillation of rosin until the color of the rosin has been materially improved.

11. The method of refining rosin containing latent color bodies which includes treating rosin with phenol separating refined rosin from phenol and then heating the refined rosin in a substantially non-oxidizing atmosphere and without substantial distillation of rosin until the color of the rosin has been materially improved.

12. The method of refining rosin which includes treating rosin with furfural separating refined rosin from furfural and then heating the refined rosin in a substantially non-oxidizing atmosphere to a temperature within about the range 250–350° C. under a pressure at which substantial distillation of the rosin will be avoided at the temperature used until the color of the rosin has been materially improved.

13. The method of refining rosin which includes treating rosin with phenol separating refined rosin from phenol and then heating the refined rosin in a substantially non-oxidizing atmosphere to a temperature within about the range 250–350° C. under a pressure at which substantial distillation of the rosin will be avoided at the temperature used until the color of the rosin has been materially improved.

14. The method of refining rosin which includes treating rosin in solution in gasoline with phenol, separating the rosin from the phenol and then heating the treated rosin in a substantially non-oxidizing atmosphere to a temperature within about the range 250–350° C. under a pressure at which substantial distillation of the rosin will be avoided at the temperature used until the color of the rosin has been materially improved.

15. The method of refining rosin which includes treating rosin with a substance an absorbent for color bodies contained in the rosin separating refined rosin from said substance and then heating the refined rosin in a substantially non-oxidizing atmosphere and without substantial distillation of rosin until the color of the rosin has been materially improved.

16. The method of refining rosin containing latent color bodies which includes treating rosin in solution in a solvent therefor with a substance a selective solvent for latent color bodies contained in the rosin and which is capable of immiscibility with the rosin solvent, separating refined rosin from the solvent and then heating the refined rosin in an atmosphere of carbon dioxide and without substantial distillation of rosin until the color of the rosin has been materially improved.

17. The method of refining rosin containing latent color bodies which includes treating rosin in solution in a suitable solvent therefor with a substance a solvent for latent color bodies contained by the rosin which is capable of substantial immiscibility with the rosin solvent, separating refined rosin from the rosin solvent and then heating the refined rosin in an atmosphere of carbon dioxide and without substantial distillation of rosin until the color of the rosin has been materially improved.

18. The method of refining rosin containing latent color bodies which includes treating rosin with furfural, separating refined rosin from furfural and then heating the refined rosin in an atmosphere of carbon dioxide and without substantial distillation of rosin until the color of the rosin has been materially improved.

19. The method of refining rosin containing latent color bodies which includes treating rosin with phenol, separating refined rosin from phenol and then heating the refined rosin in an atmosphere of carbon dioxide and without substantial distillation of rosin until the color of the rosin has been materially improved.

20. The method of refining rosin which includes treating rosin to reduce its content of color bodies and then heating the refined rosin while excluding air from the rosin and without substantial distillation of rosin until the color of the rosin has been materially improved.

21. The method of refining rosin which includes distilling rosin under reduced pressure to remove color bodies from the rosin and then heating the distilled rosin in a substantially non-oxidizing atmosphere and without substantial distillation of rosin until the color of the rosin has been materially improved.

22. The method of refining rosin which includes treating rosin to reduce its content of color bodies and then heating the refined rosin in an atmosphere of carbon dioxide and without substantial distillation of rosin until the color of the rosin has been materially improved.

23. The method of refining rosin containing color bodies which includes treating rosin in solution in a suitable solvent therefor with a suitable organic solvent for color bodies contained by the rosin and which is capable of substantial immiscibility with the rosin solution, separating the rosin from the solvent therefor and then heating the separated rosin in a substantially non-oxidizing atmosphere to a temperature within about the range 250° C.–350° C. under a pressure at which substantial distillation of the rosin will be avoided at the temperature used until the color of the rosin has been materially improved.

24. The method of refining rosin containing color bodies which includes treating rosin in solution in a suitable solvent therefor with a suitable organic solvent for color bodies contained by the rosin and which is capable of substantial immiscibility with the rosin solution, separating the rosin from the solvent therefor and then heating the separated rosin in an atmosphere of carbon dioxide to a temperature within about the range 250° C.–350° C. under a pressure at which substantial distillation of the rosin will be avoided at the temperature used until the color of the rosin has been materially improved.

25. The method of refining rosin which includes treating rosin in solution in gasoline with furfural, separating the rosin from the furfural and then heating the treated rosin in a substantially non-oxidizing atmosphere to a temperature within about the range 250° C.–350° C. under a pressure at which substantial distillation of the rosin will be avoided at the temperature used until the color of the rosin has been materially improved.

26. The method of refining rosin which includes treating rosin with fuller's earth for the removal of color bodies contained in the rosin, separating rosin from the fuller's earth and then heating the treated rosin in a substantially non-oxidizing atmosphere and without substantial distillation of the rosin until the color of the rosin has been materially improved.

27. The method of refining rosin which includes treating rosin with activated carbon for the removal of color bodies contained in the rosin, separating rosin from the activated carbon and then heating the treated rosin in a substantially non-oxidizing atmosphere and without substantial distillation of the rosin until the color of the rosin has been materially improved.

DURAIN C. BUTTS.